US007895629B1

(12) United States Patent
Shen et al.

(10) Patent No.: US 7,895,629 B1
(45) Date of Patent: Feb. 22, 2011

(54) VIDEO SERVICE BUFFER MANAGEMENT IN A MOBILE RATE CONTROL ENABLED NETWORK

(75) Inventors: Jun Shen, Redmond, WA (US); Venson Shaw, Kirkland, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 667 days.

(21) Appl. No.: 11/936,288

(22) Filed: Nov. 7, 2007

(51) Int. Cl.
*H04N 7/16* (2006.01)
*H04N 7/18* (2006.01)
*G06F 3/00* (2006.01)

(52) U.S. Cl. .................. 725/62; 725/63; 725/68; 725/75; 725/76; 725/77; 710/52

(58) Field of Classification Search ............. 725/62–63, 725/75–78; 710/52
See application file for complete search history.

(56) References Cited

U.S. PATENT DOCUMENTS

| 6,665,751 | B1 * | 12/2003 | Chen et al. .................... 710/52 |
| 7,711,841 | B2 * | 5/2010 | Deshpande .................. 709/231 |
| 7,743,183 | B2 * | 6/2010 | Virdi et al. ..................... 710/52 |
| 7,746,881 | B2 * | 6/2010 | Wildfeuer et al. ............ 370/412 |
| 2003/0223735 | A1 * | 12/2003 | Boyle .......................... 386/111 |
| 2003/0235217 | A1 * | 12/2003 | Verreault ..................... 370/519 |
| 2004/0186877 | A1 * | 9/2004 | Wang et al. .................. 709/200 |
| 2006/0282566 | A1 * | 12/2006 | Virdi et al. ..................... 710/52 |
| 2007/0291744 | A1 * | 12/2007 | Lundberg et al. ............ 370/352 |
| 2009/0089445 | A1 * | 4/2009 | Deshpande .................. 709/231 |

* cited by examiner

*Primary Examiner*—Son P Huynh
(74) *Attorney, Agent, or Firm*—Moazzam & Associates, LLC

(57) ABSTRACT

A system for a mobile wireless device to receive and display a video stream while preventing overflow or starvation of its receive buffer by requesting changes to the video streaming or encoding rates and by controlling the video playback frame rate. The current receive buffer level is used to make comparisons with several thresholds, the results of which are used to trigger actions. If the current receive buffer level has risen above a start level, then playback of the video can begin. If the current receive buffer level rises above an early detection threshold, then the video streaming device is requested to slow its streaming rate. If the current receive buffer level rises above a high level threshold, then the video streaming device is requested to stop streaming the video. If the current receive buffer level drops below a low level threshold, then the playback frame rate is slowed.

13 Claims, 3 Drawing Sheets

VIDEO SERVICE BUFFER MANAGEMENT IN A MOBILE RATE CONTROL ENABLED NETWORK

BACKGROUND OF THE INVENTION

1. Field of the Invention

The present invention is directed generally to mobile wireless devices that receive streaming video. In particular, the present invention is directed to a mobile wireless device controlling the encoding rate of a received video stream.

2. Description of the Related Art

Providers of mobile wireless communication networks are offering additional services beyond voice communications. One highly desirable service to add is streaming video. This service allows a video streaming device to stream video to a receiving mobile wireless device over a wireless communications network.

A video is a series of image frames that can be shown in sequence by a video player. A video player sequentially displays the frames to create a video viewing experience. The quality of the video viewing experience is influenced by the resolution of the frames and the rate at which the frames are played (the playback frame rate). Videos with higher frame resolutions are perceived by most viewers as having higher quality. The playback frame rate is also important for good quality video viewing. If the playback frame rate is too slow, objects in the video will seem to move in an erratic fashion.

A video is originally recorded at a video bit rate (the video rate) that is proportional to the product of the recorded frame resolution and the recorded frame rate. However, high video rates may require too much memory to store or too much bandwidth to transmit in some applications. Video encoders may be used to compress the original video stream, resulting in an encoded video stream with an encoding bit rate (the encoding rate) that is substantially less than the original video rate. However, since most encoding methods are lossy, slower encoding rates usually mean poorer video quality when an encoded video is decoded and played back.

A video streaming device usually sends out an encoded video in a stream at a streaming bit rate (the streaming rate) that is approximately equal to the encoding rate. A transmit buffer on the video streaming device can store part of the encoded video stream that the video streaming device is not yet ready to send and a receive buffer on the receiving mobile wireless device can store the part of the encoded video stream that the receiving device is not yet ready to playback. The transmit buffer allows the streaming rate to be slightly faster or slower than the encoding rate for short periods of time. The transmit buffer fills (or empties) at a rate equal to the encoding rate minus the streaming rate. The receive buffer allows the streaming rate to be slightly faster or slower than the playback rate for short periods of time. The receive buffer fills (or empties) at a rate equal to the streaming rate minus the playback rate, where the playback bit rate is the product of the playback frame rate and the number of bits per frame. Since these buffers have a finite size, larger or longer variations can lead to buffer overflow or starvation (buffer empty), either of which can cause degradation or interruption in the playback of the video.

For example, increasing the encoding rate of the video streaming device creates a risk of buffer overflow. When the video streaming device increases its encoding rate, some time afterwards it will increase its streaming rate to prevent buffer overflow in the video streaming device. The increased streaming rate will cause the receive buffer on the receiving device to fill up. This happens because the receiving device is still removing video from the receive buffer that was encoded at the old, slower encoding rate while video is being added at a new, higher encoding rate. The slower encoding rate video may not be used up before the new higher encoding rate video overflows the receiver buffer.

The conventional approach to the problems of receive buffer overflow or starvation is to size the receive buffer large enough to mask the effects of anticipated interruptions or changes in the streaming rate of the video. However, this can result in the receive buffer being quite large, which is undesirable. Larger components in general are undesirable for a mobile device. Also, a larger buffer lengthens initial delay in playback, which is undesirable. For a buffer to effectively guard against both overflow and starvation, it must be about half full and half empty. The initial delay in playback is the time from when the mobile wireless receiving device begins receiving a stream to the time when the buffer fills to the halfway point. When the buffer is larger, this initially delay is longer.

These conflicting design constraints on buffer size become more severe as the streaming and encoding rate of the video streams become faster. What is needed is a mobile wireless communication device to receive video with a mechanism to control the video encoding and streaming rates to prevent overflow or starvation of the receive buffer.

BRIEF DESCRIPTION OF THE SEVERAL VIEWS OF THE DRAWING(S)

Figure 3:
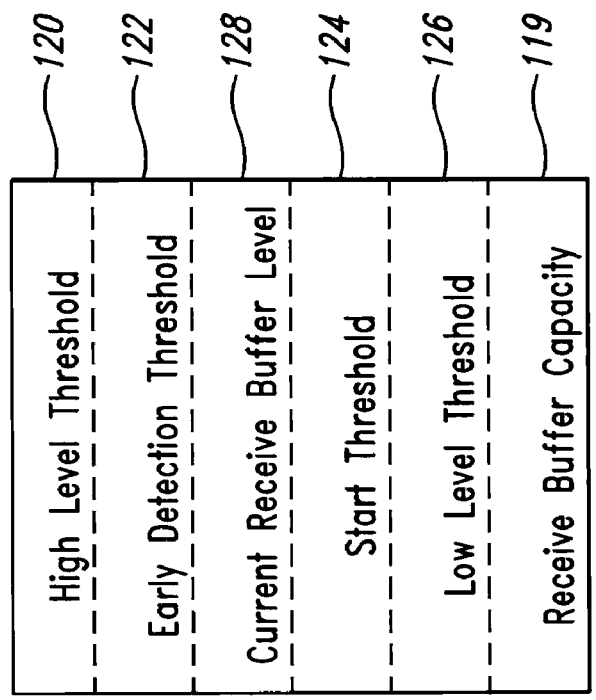
Figure 2:
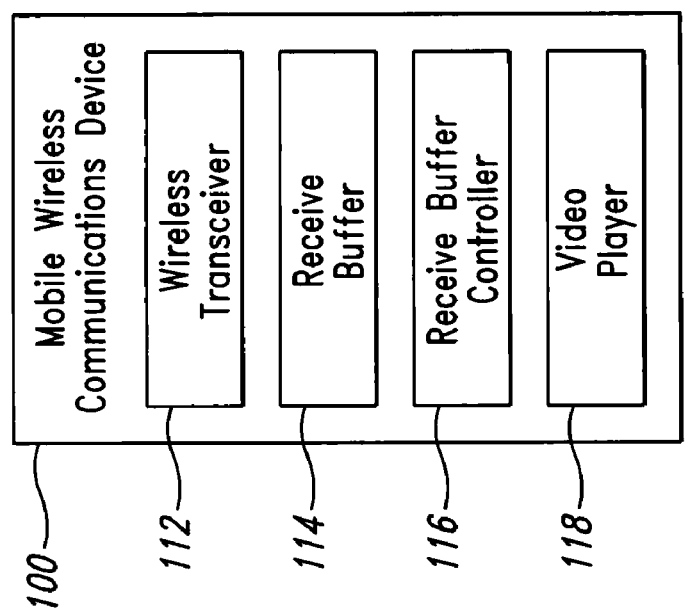
FIG. 2 shows components of the mobile wireless device used to receive and display the video stream.

FIG. 3 graphically presents values associated with the buffer in the mobile wireless device of FIG. 2.

Figure 1:
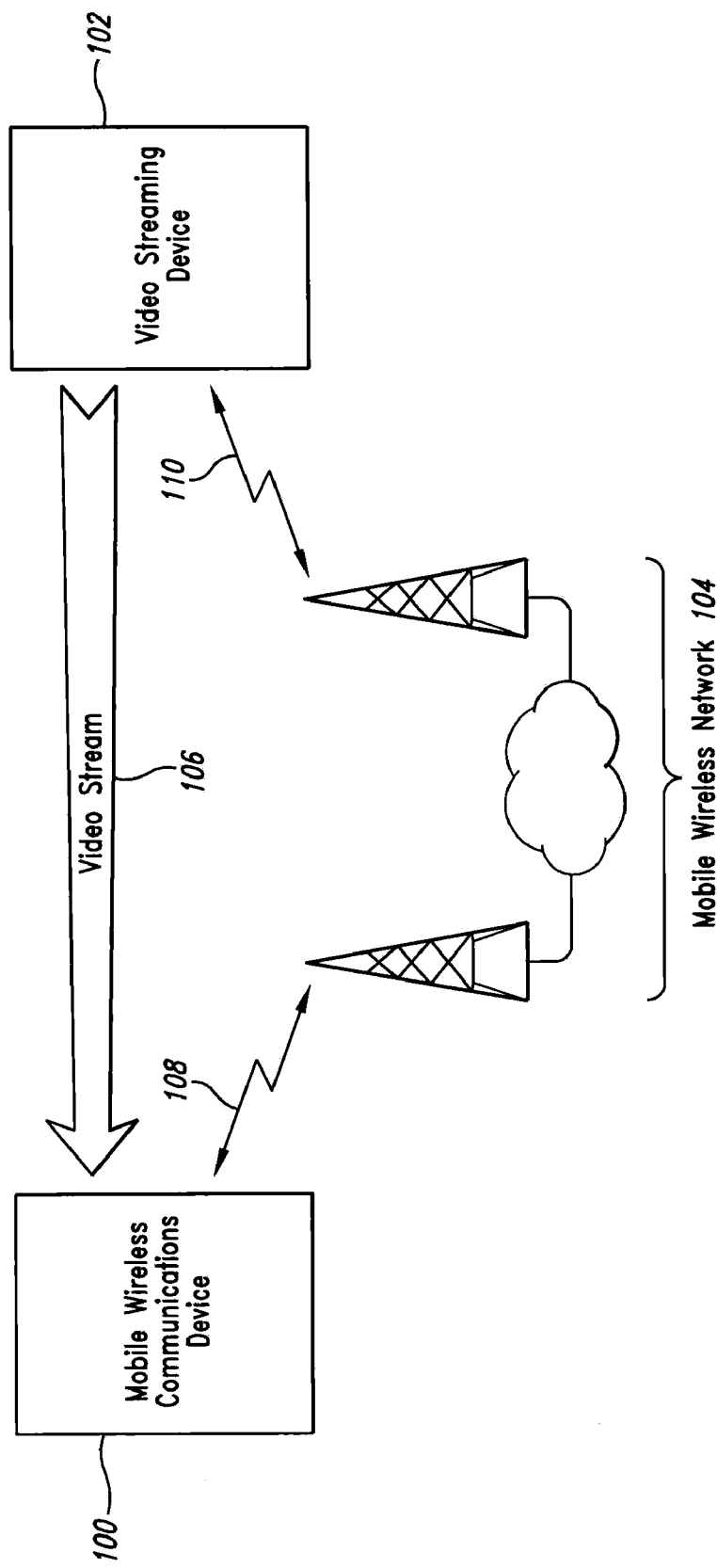
FIG. 1 shows a mobile wireless device wirelessly connected to a video streaming device through a mobile wireless network for the purpose of receiving a video stream.
Figure 4:
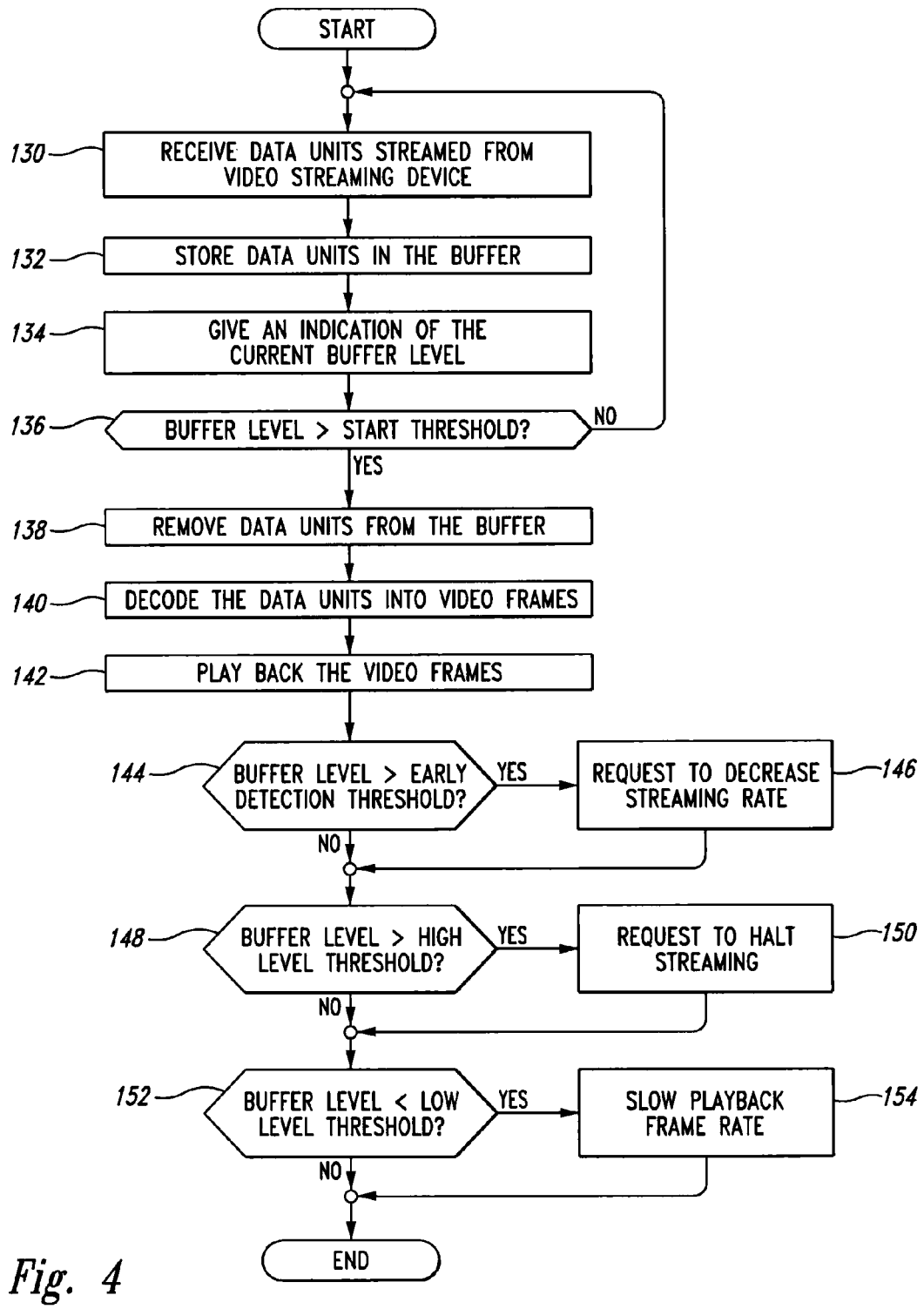

FIG. 4 shows a flowchart of a method for the mobile wireless device of FIG. 1 to buffer the video stream received via the mobile wireless network.

DETAILED DESCRIPTION OF THE INVENTION

FIG. 1 shows a mobile wireless device 100 connected to a video streaming device 102 through a mobile wireless network 104 for the purpose of receiving a video stream 106. The mobile wireless device 100 is connected to the mobile wireless network 104 through a wireless channel 108. In some embodiments, the video streaming device 102 is connected to the mobile wireless network 104 via another wireless channel 110. In other embodiments, the video streaming device 102 is connected to the mobile wireless network 104 through wired means. In some embodiments, the wireless channels 108, 110 may be radio channels. In other embodiments, the wireless channels 108, 110 may be infrared or another type of wireless channel. The mobile wireless device 100 can send messages, including requests, to the video streaming device over the mobile wireless network 104 using one or more methods known in the art.

The video stream 106 is a stream of data units created by encoding a video image. The term "data units" as used herein refers to the basic quanta of data handled by the video streaming device 102. The data units may be bits, bytes or words of specified size. The video stream 106 may be in any protocol that can be encoded by the video streaming device 102, transported across the mobile wireless network 104 and decoded by the mobile wireless device 100.

The video streaming device 102 is configured to encode a video image and can do so at various encoding rates. In some embodiments, the video streaming device 102 is a mobile device. In other embodiments, the video streaming device 102 is not a mobile device.

The mobile wireless network 104 is structured in a way that supports the transport of a video stream 106. In some embodiments, the mobile wireless network 104 conforms to the Universal Mobile Telecommunications Service (UMTS) standard. In other embodiments, the mobile wireless network 104 conforms to other standards or does not conform to any particular standard.

The mobile wireless network 104 has the ability to change the capacity of the wireless channels 108, 110. If the mobile wireless network 104 determines that the quality of one of the wireless channels 108, 110 is unacceptably degraded, the mobile wireless network 104 may decrease the capacity of that wireless channel in an attempt to improve channel quality. In some networks, wireless channels with slower transmission rates have better error rates than faster transmission rates in the same wireless environment. For example, in networks such as UMTS that use code division multiple access (CDMA), the capacity of one of the wireless channels can be decreased by increasing the spreading factor of the underlying physical channel. Increasing the spreading factor aids the wireless channel in overcoming a poor radio environment. Conversely, the capacity of the wireless channel can be increased if the spreading factor is reduced. The mobile wireless network 104 can also increase the capacity of one of the wireless channels 108, 110 if it determines that conditions related to that channel are sufficient to support an increased transmission capacity while maintaining an acceptable level of quality and if it determines that there is demand for additional capacity on that channel.

FIG. 2 shows components of the mobile wireless device 100 used to receive and display the video stream 106. Components of the mobile wireless device 100 include a wireless transceiver 112, a receive buffer 114, a receive buffer controller 116, and a video player 118.

The wireless transceiver 112 is configured to receive the video stream 106 from the video streaming device 102 via the mobile network 104. The wireless transceiver 112 passes the data units as it receives them to the receive buffer 114.

The receive buffer 114 has the ability to store the received data units. The receive buffer 114 has a buffer capacity 119 (FIG. 3), which is not a component of the receive buffer 114, but rather an attribute of the receive buffer 114 related to how much data the receive buffer 114 can hold.

FIG. 3 graphically presents values 120, 122, 124, 126, 128 associated with the receive buffer 114 in the mobile wireless device 100. These values 120, 122, 124, 126, 128 are neither components of the receive buffer 114 nor attributes of the receive buffer 114. Instead, these values each represent a different fraction of the buffer capacity 119. FIG. 3 graphically represents the buffer capacity 119 as a rectangle and represents each of these values 120, 122, 124, 126, 128 as a horizontal line in the rectangle, wherein the magnitude of the value is represented by the height of the horizontal line in the rectangle. For example, the entire rectangle represents 100% buffer capacity 119 and a line three-fourths of the way up the rectangle represents 75% buffer capacity 119.

One value associated with the receive buffer 114 is a current receive buffer level 128 that corresponds to a fraction of the buffer capacity 119 that is currently storing data units. The current receive buffer level 128 will change over time as data units are stored in the receive buffer 114 or removed. The receive buffer 114 is configured to give indications of the current receive buffer level 128 to other components of the mobile wireless device 100. In some embodiments, the receive buffer 114 gives indications of the current receive buffer level 128 by measuring the current receive buffer level 128 and sending the results to other components. In other embodiments, the receive buffer 114 gives indications of the current receive buffer level 128 by allowing another component, such as the receive buffer controller 116, to access the receive buffer 114 and measure the current receive buffer level 128.

Other values associated with the receive buffer 114 are a high level threshold 120, an early detection threshold 122, a start threshold 124, and a low level threshold 126. These thresholds 120, 122, 124, 126, may be compared with the current receive buffer level 128 and various actions may be triggered by the results of the comparisons. In some embodiments, these threshold values 120, 122, 124, 126 are stored in the buffer itself 114. In other embodiments, the threshold values 120, 122, 124, 126, are stored in another component of the mobile wireless device 100.

Returning to FIG. 2, the receive buffer controller 116 has the ability to receive indications of the current receive buffer level 128. The receive buffer controller 116 is configured to compare indications of the current receive buffer level 128 to the early detection threshold 122. The receive buffer controller 116 is configured to send a request to the video streaming device 102 to decrease the streaming rate if the current receive buffer level 128 rises above the early detection threshold 122. The early detection threshold 122 may be about 75% of the buffer capacity 119, but other values may be used. In some embodiments, the early detection threshold 122 may be 75% of the high level threshold 120. In most cases, the video streaming device 102 will respond to this request by decreasing the streaming rate, then some time afterwards, decreasing the encoding rate to prevent the transmit buffer from overflowing.

In some embodiments, the receive buffer controller 116 is configured to compare indications of the current receive buffer level 128 to the early detection threshold 122 and send a request to the video streaming device 102 to decrease the encoding rate if the current receive buffer level 128 rises above the early detection threshold 122. In most cases, the video streaming device 102 will respond to this request by decreasing the encoding rate, then some time afterwards, decreasing the streaming rate to prevent the transmit buffer from emptying out. Thus a request to decrease the encoding rate is an indirect way to request to decrease the streaming rate, since in the long term, they both have the same effect. However, embodiments in which the mobile wireless device requests the video streaming device 102 to decrease the encoding rate, the video streaming device 102 may not decrease the streaming rate for some time. How long this time delay will be depends on how the video streaming device 102 is configured to handle the request to decrease the encoding rate. If the video streaming device is configured 102 not decrease the encoding rate until it can simultaneously decrease the streaming rate, there will be no time delay. If the video streaming device is configured 102 to promptly decrease the encoding rate, then decrease the streaming rate when its transmit buffer fills past a threshold, then there will be a significant time delay. On the mobile wireless device 100, the receive buffer 114 will likely continue to fill during this time delay and may overflow. In embodiments in which the mobile wireless device 100 requests the video streaming device 102 to decrease the streaming rate, this time delay is eliminated.

In some embodiments, the receive buffer controller 116 is configured to compare indications of the current receive buffer level 128 to the high level threshold 120. The receive buffer controller 116 is configured to send a request to the video streaming device 102 to stop streaming if the current receive buffer level 128 rises above the high level threshold 120. The high level threshold 120 may be 90% of the buffer capacity 119, but other values may be used.

In some embodiments, the receive buffer controller 116 is configured to compare indications of the current receive buffer level 128 with the low level threshold 126. The receive buffer controller 116 is configured to send a request to the video player 118 to decrease the playback frame rate used by the video player 118 if the current receive buffer level 128 falls below the low level threshold 126. The low level threshold 126 may be 10% of the buffer capacity 119, but other values may be used. In some embodiments, the low level threshold 126 may be 10% of the high level threshold 120.

In some embodiments, the receive buffer controller 116 is configured to compare indications of the current receive buffer level 128 with the low level threshold 126 and send a request to the video streaming device 102 to increase the streaming rate if the current receive buffer level 128 falls below the low level threshold 126. Alternatively, the receive buffer controller 116 may be configured to send a request to the video streaming device to increase the encoding rate if the current receive buffer level 128 falls below the low level threshold. In most cases, this will eventually cause the video streaming device 102 to increase the streaming rate to prevent its transmit buffer from overflowing.

In some embodiments, the receive buffer controller 116 is configured to compare indications of the current receive buffer level 128 to the start threshold 124. The receive buffer controller 116 has the ability to prevent the video player 118 from removing data units from the receive buffer 114 until after the current receive buffer level 128 has risen above the start threshold 124 at least once since the receive buffer 114 began storing data units from the video stream 106. The start threshold 124 may be 50% of the buffer capacity 119, but other values may be used. In some embodiments, the start threshold may be 50% of the high level threshold 120.

The video player 118 is configured to remove data units from the receive buffer 114 and to decode the data units removed from the receive buffer 114 into decoded video frames. The video player 118 is configured to sequentially display the decoded video frames. The video player 118 is configured to change the playback frame rate it uses to play the decoded video frames. The video player 118 may use the frame rate at which the original video was recorded. Alternatively, the video player 118 may use a playback frame rate may be faster or slower than the original. In some embodiments, the video player 118 is configured to use a playback frame rate set according to instructions from the receive buffer controller 116.

In some embodiments, the receive buffer 114 capacity is large enough to handle without buffer starvation anticipated interruptions in the streaming of the video stream 106 due to network handoffs. Handoff interruptions are typically the longest interruptions anticipated in streaming a video. In a UMTS network, handoff interruptions include Radio Network Controller (RNC) handoff interruptions and Serving GPRS Support Node (SGSN) handoff interruptions.

In some embodiments, the receive buffer 114 is configured to avoid exceeding the high level threshold 120 after the video streaming device 102 has increased the encoding rate. The video streaming device 102 may increase the encoding rate on its own initiative or at the request of the mobile wireless device 100. Increasing the encoding rate will result in a surge of data units flowing into the receiver buffer. This surge occurs because after the video streaming device 102 has increased the encoding rate, the video streaming device 102 may not be able to immediately increase the streaming rate to match due to insufficient capacity in resources the mobile wireless network 104 assigned to carry the video stream 106. Particularly, the wireless channels 108, 110 assigned to carry the video stream 106 may not have enough capacity. A time delay may occur before the mobile wireless network 104 increases the capacity of resources assigned. During this time delay, the streaming rate may be less than the encoding rate, resulting in an accumulation of data units in the transmit buffer. Once the mobile wireless network 104 has increased the capacities of the resources assigned, the video streaming device 102 will increase the streaming rate to above the encoding rate in an effort to eliminate the accumulation in the transmit buffer, resulting in the surge of data units. The size of this surge is equal to the product of the time delay and a typical data speed, where the typical data speed is the encoding rate during the delay minus the streaming rate during the delay. To avoid exceeding the high level threshold 120, a sufficient receive buffer capacity margin should be maintained, where the buffer capacity margin is the product of the buffer capacity 119 times the difference between the high level threshold 120 minus the current receive buffer level 128 before the surge (the "pre-surge buffer level"). The receive buffer capacity margin is sufficient when it is greater than or equal to the size of the surge. The receive buffer capacity margin may be made sufficient by sizing the receive buffer capacity sufficiently large, if the setting of the high level threshold is known and one can anticipate the values of the pre-surge buffer level, the time delay, the encoding rate during the delay and the streaming rate during the delay. Alternatively, the receive buffer capacity margin may be made sufficient by maintaining the pre-surge buffer level sufficiently low, if the setting of the high level threshold is known, the buffer capacity is known and one can anticipate the values of the time delay, the encoding rate during the delay and the streaming rate during the delay.

FIG. 4 shows a flowchart of a method for the mobile wireless device 100 of FIG. 1 to buffer the video stream 106 received via the mobile wireless network 104.

In step 130, the mobile wireless device 100 receives data units streamed from a video streaming device 102. The data units are created by the video streaming device 102 when it encodes the video.

In step 132, the mobile wireless device 100 stores the received data units in the receive buffer 114. The receive buffer 114 has a finite capacity. As data units are stored in the receive buffer 114, the current receive buffer level 128 will increase at a rate equal to the rate at which data units are stored in the receive buffer 114 minus the rate at which data units are removed from the receive buffer 114. If the receive buffer 114 is filled to capacity, then the receive buffer 114 will overflow and some data units may be lost. The mobile wireless device 100 may handle overflow by dumping the oldest data units in the receive buffer 114. Alternatively, the mobile wireless device 100 may handle overflow in another way, such as by dumping the data units last received.

In step 134, the mobile wireless device 100 gives an indication of its current receive buffer level 128. The current receive buffer level 128 is used in later steps in comparisons that provide the logical trigger for various actions.

In step 136, a comparison is made of the indicated current receive buffer level 128 with the start threshold 124. If the current receive buffer level 128 has risen above the start threshold 124 at least once since the receive buffer 114 began storing data units from the received video stream 106 then the mobile wireless device 100 performs the remaining steps of the method. Else, the mobile wireless device 100 returns to the beginning of the method and repeats the steps 130-136.

In step 138, the mobile wireless device 100 removes data units from the receive buffer 114. As data units are removed from the receive buffer 114, the current receive buffer level 128 will decrease at a rate equal to the rate data units are removed from the receive buffer 114 minus the rate that data units are stored in the receive buffer 114.

In step 140, the mobile wireless device 100 decodes the removed data units into decoded video frames.

In step 142, the mobile wireless device 100 plays the decoded video frames at a specified playback frame rate.

In step 144, the mobile wireless device 100 compares the current receive buffer level 128 with the early detection threshold 122. If the current receive buffer level 128 rises above the early detection threshold 122, then the mobile wireless device, 100 performs step 146, sending a request to the video streaming device 102 to decrease the streaming rate. In most cases, the video streaming device 102 will respond to this request by decreasing the streaming rate, then some time afterwards, decreasing the encoding rate to prevent the transmit buffer from overflowing.

In an alternative embodiment of step 144, the mobile wireless device 100 sends a request to the video streaming device 102 to decrease the encoding rate if the current receive buffer level 128 rises above the early detection threshold 122. In most cases, the video streaming device 102 will respond to this request by decreasing the encoding rate, then some time afterwards, decreasing the streaming rate to prevent the transmit buffer from emptying out. Thus a request to decrease the encoding rate is an indirect way to request to decrease the streaming rate, since in the long term, both will have the same effect. However, embodiments in which the mobile wireless device requests the video streaming device 102 to decrease the encoding rate, the video streaming device 102 may not decrease the streaming rate for some time. However, embodiments in which the mobile wireless device requests the video streaming device 102 to decrease the encoding rate, the video streaming device 102 may not decrease the streaming rate for some time. How long this time delay will be depends on how the video streaming device 102 is configured to handle the request to decrease the encoding rate. If the video streaming device is configured 102 not decrease the encoding rate until it can simultaneously decrease the streaming rate, there will be no time delay. If the video streaming device is configured 102 to promptly decrease the encoding rate, then decrease the streaming rate when its transmit buffer fills past a threshold, then there will be a significant time delay. On the mobile wireless device 100, the receive buffer 114 will likely continue to fill during this time delay and may overflow. In embodiments in which the mobile wireless device 100 requests the video streaming device 102 to decrease the streaming rate, this time delay is eliminated.

In step 148, the mobile wireless device 100 compares the current receive buffer level 128 with the high level threshold 120. If the current receive buffer level 128 rises above the high level threshold 120, then the mobile wireless device 100 performs the additional step 150 of sending a request to the video streaming device 102 to halt the streaming of the video stream 106.

In step 152, the mobile wireless device 100 compares the current receive buffer level 128 the low level threshold 126. If the current receive buffer level 128 falls below the low level threshold 126, then the mobile wireless device 100 performs a further step 154 of slowing the playback frame rate. In some embodiments, if the current receive buffer level 128 falls below the low level threshold 126, then the mobile wireless device 100 additionally or alternatively sends a request to the video streaming device 102 to increase the streaming rate. Most video streaming devices 102 will respond to this request by increasing the streaming rate. If the encoding rate is then less than the streaming rate, the transmit buffer on the video streaming device 102 will begin to empty out. Eventually, the video streaming device may take action to prevent the transmit buffer from completely emptying out, such as increasing the encoding rate or reverting back to the original, slower streaming rate. In the mean time, the surge of video stream 106 data units brought by the increased streaming rate will have partially refilled the receive buffer 114.

If the video stream 106 has not been completely received and played back, the relevant steps of the method are repeated.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

The components herein may in some embodiments be implemented as a computer processor coupled to a memory, the memory containing instructions that when executed by the computer processor, perform the functions as described above. In other embodiments, the components may be realized as hard-wired circuits.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A mobile wireless device to buffer and display a video received from a video streaming device via a mobile wireless network comprising:
   a wireless transceiver receives a video stream of data units at a streaming rate from the video streaming device via the mobile wireless network, the video stream of data units created by the video streaming device encoding the video at an encoding rate, the video comprising a sequence of frames;
   a receive buffer stores the received data units, the receive buffer having a receive buffer capacity, the receive buffer indicates a current receive buffer level corresponding to a fraction of the receive buffer capacity currently storing data units;
   a video player removes data units from the receive buffer, the video player to decode the removed data units into decoded video frames, the video player to sequentially display the decoded video frames at a playback frame rate; and
   a receive buffer controller compares the current receive buffer level with an early detection threshold, the receive buffer controller sends a request to the video streaming device to decrease the streaming rate if the current receive buffer level rises above the early detection threshold;
   wherein the receive buffer controller compares the current receive buffer level with a high level threshold, the receive buffer controller sends a request to the video streaming device to halt the streaming of the video stream if the current receiver buffer level rises above the high level threshold;
   wherein the receive buffer has a receive buffer margin sufficient to prevent an overflow of the receive buffer in the event of a data unit surge resulting from the video streaming device increasing the encoding rate, wherein the receive buffer margin is a product of the receive buffer capacity times a difference between the high level threshold and a pre-surge buffer level; and
   wherein the receive buffer margin is sufficient to prevent the overflow of the receive buffer when the receive buffer margin is greater than or equal to a size of the surge, wherein the size of the surge is the product of a time delay and a typical data speed, wherein the time delay is a time required for the mobile wireless network to increase capacities of one or more network resources carrying the video stream in response to the video streaming device increasing the encoding rate, wherein the typical data speed is the encoding rate during the delay minus the streaming rate during the delay.

2. The mobile wireless device of claim 1, wherein the video player is configured to remove data units only after the current receive buffer level has risen above a start threshold at least once since the receive buffer began storing the data units from the received video stream.

3. The mobile wireless device of claim 1, wherein the receive buffer controller is configured to compare the current receive buffer level with a low level threshold, the receive buffer controller configured to send a request to the video player to decrease the playback frame rate if the current receive buffer level falls below the low level threshold.

4. The mobile wireless device of claim 1, wherein the receive buffer controller is configured to compare the current receive buffer level with a low level threshold, the receive buffer controller configured to send a request to the video streaming device to increase the streaming rate if the current receive buffer level falls below the low level threshold.

5. The mobile wireless device of claim 1, wherein the receive buffer controller is configured to send a request to the video streaming device to decrease the streaming rate by sending a request to the video streaming device to decrease the encoding rate.

6. The mobile wireless device of claim 1, wherein the receive buffer capacity is size sufficiently large enough to handle anticipated interruptions in the streaming of the video stream due to network handoffs without buffer starvation.

7. The mobile wireless device of claim 1, wherein the receive buffer capacity is large enough to make the receive buffer margin sufficient to prevent the overflow of the receive buffer, wherein the high level threshold is known, and wherein the pre-surge buffer level, the time delay, the encoding rate during the delay and the streaming rate during the delay are anticipated.

8. The mobile wireless device of claim 1, wherein the receive buffer controller is configured to maintain the receive buffer margin sufficient to prevent the overflow of the receive buffer by maintaining a sufficiently low pre-surge buffer level using known values for the high level threshold and the buffer capacity and using anticipated values for the time delay, the encoding rate during the delay and the streaming rate during the delay.

9. A method to buffer and display on a mobile wireless device a video stream received from a video streaming device via a mobile wireless network comprising:
   receiving a video stream of data units at a streaming rate from the video streaming device via the mobile wireless network, the data units created by the video streaming device encoding the video at an encoding rate, the video comprising a sequence of frames;
   storing the received data units in a receive buffer, the receive buffer having a receive buffer capacity;
   indicating a current receive buffer level corresponding to a fraction of the receive buffer capacity currently storing data units;
   comparing the current receive buffer level with an early detection threshold;
   sending a request to the video streaming device to decrease the streaming rate if the current receive buffer level rises above the early detection threshold;
   removing data units from the receive buffer;
   decoding the removed data units into decoded video frames;
   playing the decoded video frames at a playback frame rate;
   comparing the current receive buffer level with a high level threshold and sending a request to the video streaming device to halt the streaming of the video stream if the current receive buffer level rises above the high level threshold; and maintaining a receive buffer capacity margin sufficient to prevent an overflow of the receive buffer in the event of a data unit surge resulting from the video streaming device increasing the encoding rate, wherein the receive buffer margin is a product of the receive buffer capacity times a difference between the high level threshold and a pre-surge buffer level, wherein the receive buffer margin is sufficient when greater than or equal to a size of the surge, wherein the size of the surge is the product of a time delay and a typical data speed, wherein the time delay is a time required for the mobile wireless network to increase capacities of one or more network resources carrying the video stream in response to the video streaming device increasing the encoding rate, wherein the typical data speed is the encoding rate during the delay minus the streaming rate during the delay.

10. The method of claim 9, wherein the removing of data units from the receive buffer is performed only after the current receive buffer level has risen above a start threshold at least once since the receive buffer began storing the received data units.

11. The method of claim 9, further comprising comparing the current receive buffer level with a low level threshold and slowing the playback frame rate if the current receive buffer level falls below the low level threshold.

12. The method of claim 9, wherein sending a request to the video streaming device to decrease the streaming rate comprises sending a request to the video streaming device to decrease the encoding rate of the video.

13. The method of claim 9, wherein maintaining the receive buffer capacity margin sufficient to prevent overflow of the receive buffer comprises maintaining a sufficiently low pre-surge buffer level using known values for the high level threshold and the buffer capacity and using anticipated values for the time delay, the encoding rate during the delay and the streaming rate during the delay.

\* \* \* \* \*